United States Patent [19]

Trudeau

[11] 4,419,027
[45] Dec. 6, 1983

[54] BELLOWS SEAL FOR BALL AND SOCKET JOINTS

[75] Inventor: William H. Trudeau, Brighton, Mich.

[73] Assignee: Gulf & Western Manufacturing Company, Southfield, Mich.

[21] Appl. No.: 251,253

[22] Filed: Apr. 6, 1981

[51] Int. Cl.³ .............................................. F16C 11/06
[52] U.S. Cl. ................................. 403/134; 403/138; 403/36; 277/212 FB
[58] Field of Search ............... 403/134, 138, 144, 36, 403/124, 135, 50; 277/212 B, 212 FB

[56] References Cited

U.S. PATENT DOCUMENTS

| | | | |
|---|---|---|---|
| 2,593,253 | 4/1952 | Booth | 403/138 X |
| 3,052,477 | 9/1962 | Parker | 403/134 X |
| 3,248,955 | 5/1966 | Templeton | 403/134 X |
| 3,322,445 | 5/1967 | Hassan | 277/212 FB |
| 3,404,909 | 10/1968 | Gottschald | 277/212 FB |
| 3,547,473 | 12/1970 | Gottschald | 277/212 |
| 3,547,474 | 12/1970 | Colletti et al. | 277/212 FB X |

FOREIGN PATENT DOCUMENTS 1583673 1/1981 United Kingdom ......... 277/212 FB

Primary Examiner—Andrew V. Kundrat
Assistant Examiner—Joseph A. Fischetti
Attorney, Agent, or Firm—Hauke and Patalidis

[57] ABSTRACT

In a ball and socket joint comprising a ball and a socket in mutual swivelling sliding engagement with each other, the ball having a stud integrally formed at one end thereof and projecting outwardly through one end of the socket, the improvement consisting in forming the socket with a diverging frusto-conical flange extending in the direction of the stud and defining an integrally formed retention flange for a flexible oil-resistant seal having a bellows type body provided at one end with an annular band stretched over the periphery of the stud and at the other end with a reinforcing bead stretched over the retention flange.

12 Claims, 7 Drawing Figures

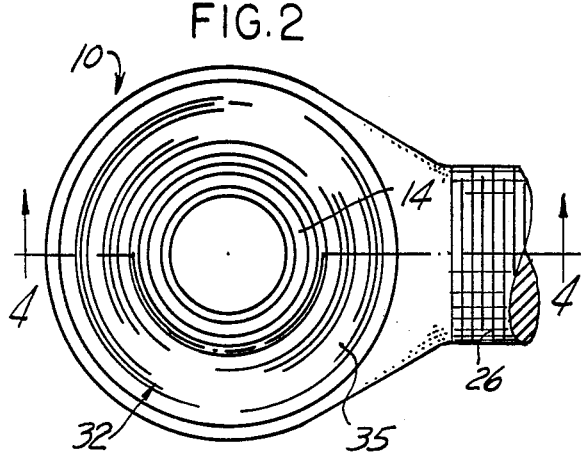
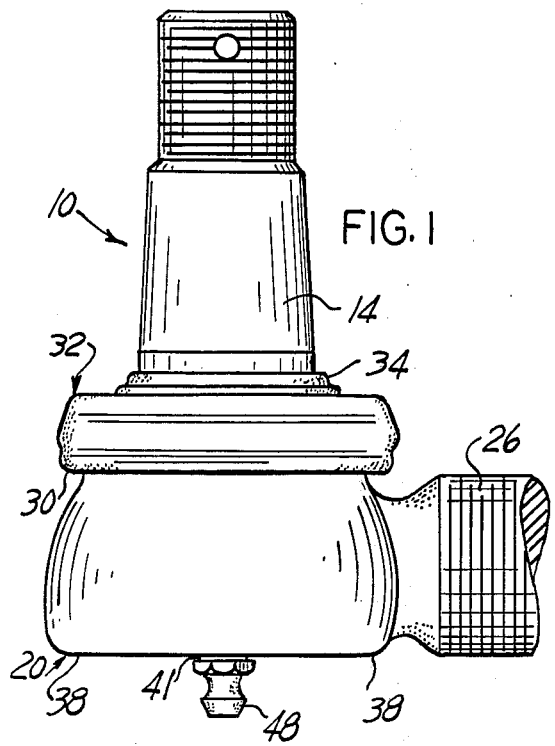
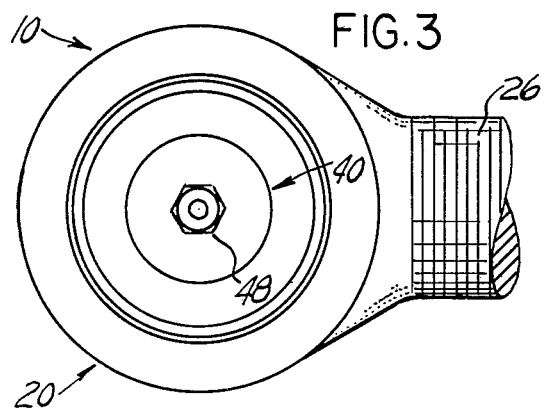
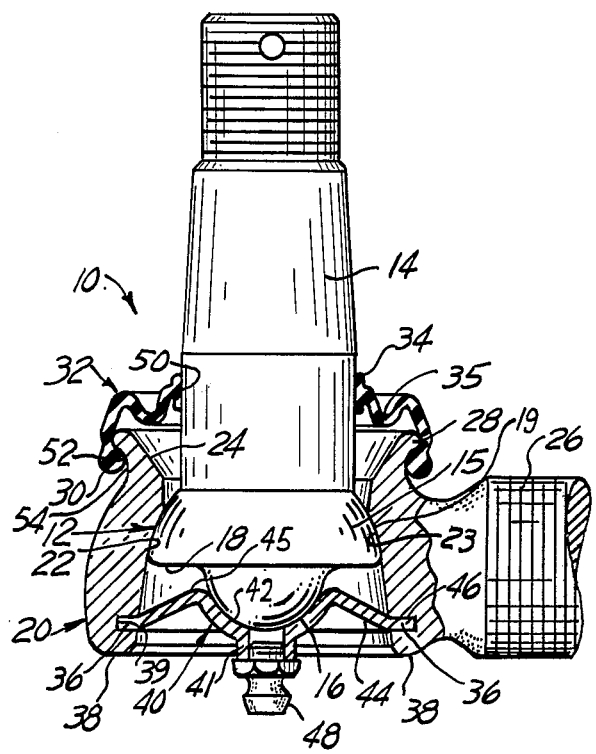

4,419,027

BELLOWS SEAL FOR BALL AND SOCKET JOINTS

CROSS-REFERENCE TO RELATED APPLICATIONS

The present application is related to application Ser. No. 251,254, for Improved Ball and Socket Joints, filed contemporaneously with this application and assigned to the same assignee as the present application.

BACKGROUND OF THE INVENTION

The present invention relates to a bellows seal for a ball and socket joint having improved means for sealing the same against entrance of foreign matter.

Ball and socket joints generally consist of a stud terminating in a ball member disposed in swivelling slidable engagement within a socket member having a concave spherical segment conforming to that of the ball. Ball and socket joints are commonly used in motor vehicle steering tie rod assemblies, in drag links, torque rods and like structures which, in service, are exposed to dust, dirty water splashes, mud and other foreign matter, and the joints are often provided with seals preventing entrance of foreign matter into the assembly. Bellows seals are generally used for preventing entrance of foreign matter between the bearing surfaces at the end of the socket from which a mounting stud projects, the mounting stud being welded to or formed integrally with a ball member having a partially spherical surface in the socket member. The bellows seals are made of flexible material, such as rubberized canvas, thin natural rubber or preferably synthetic rubber, neoprene, urethane and the like, an end of the bellows being disposed in tight engagement with a portion of the peripheral surface of the stud member, and the other end of the bellows being attached to the socket. Adhesive, garter springs, elastic O-rings, circular clamps and other fastening means have been used in the past for attaching bellows seals to socket members, but it has been found that most bellows seals become detached from the socket member during use in the field due to failure of the fastening means, often long before the bellows portion of the seal has deteriorated beyond normal usefulness.

SUMMARY OF THE INVENTION

The present invention remedies the shortcomings of prior art bellows seals by providing, in combination with a ball and socket joint which has an integrally formed retention flange on the socket for holding the corresponding end of the bellows in place at the edge of the socket, a bellows seal having a reinforcing bead at the edge of the bellows end stretched over the socket retention flange.

Because of its excellent retention the bellows seal attachment arrangement of the invention is particularly useful for heavy duty applications, such as truck or tractor tie rods, drag links, torque rods and the like. In addition, the present invention provides a bellows seal for a swivel joint which is able to handle relatively large amounts of angular displacement between the joined elements.

Other objects and advantages of the present invention will become apparent to those skilled in the art when the following description of the best modes contemplated for practicing the invention is read in conjunction with the accompanying drawings wherein like numerals refer to like or equivalent parts and in which:

BRIEF DESCRIPTION OF THE DRAWINGS

FIGS. 1 through 3 are, respectively, side elevational, top and bottom plan views of a swivel joint embodying the present invention;

FIG. 4 is a sectional view thereof along line 4—4 of FIG. 1;

FIG. 5 is a view similar to FIG. 4 but showing the swivel joint under extreme angulation;

DETAILED DESCRIPTION OF THE PREFERRED EMBODIMENT

Figure 6:
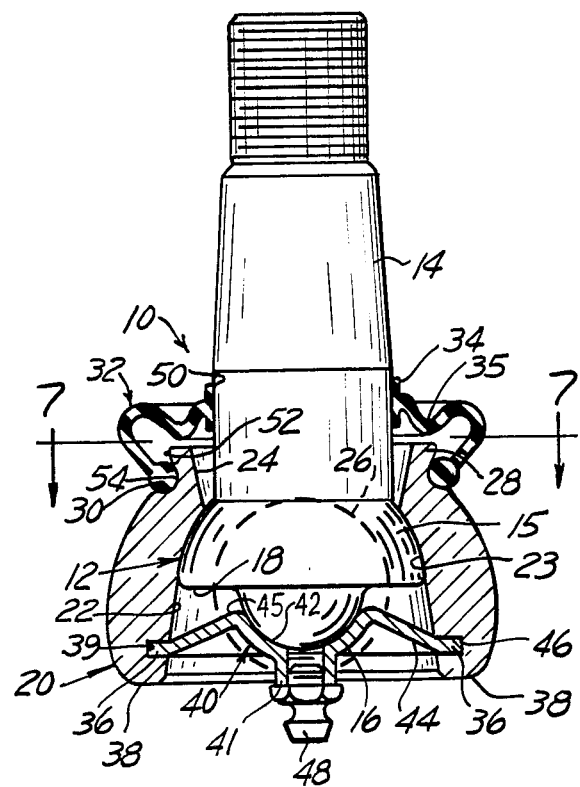
FIG. 6 is a view similar to FIG. 4, but taken in a plane perpendicular to the plane of FIG. 4 and showing a modification thereof.

Referring to the drawings in greater detail, the example of structure shown therein for a knuckle or swivel joint 10 is that disclosed generally in copending application Ser. No. 251,254, filed contemporaneously herewith and assigned to the same assignee as the present application. The knuckle or swivel joint 10, which per se forms no part of the present invention, consists of a cold-headed ball 12, having a projecting stud 14 integrally formed at one end thereof, FIG. 4. The ball 12 comprises a main body portion 15 of relatively large diameter proximate its integral junction with the stud 14. The side of the ball 12 diametrically opposite to the stud 14 has a hemispherical protrusion 16 of substantially smaller diameter than the ball main body portion 15, a generally flat annular shoulder 18 surrounding the hemispherical protrusion 16. The main portion 15 of the ball 12, between the shoulder 18 and the stud 14 is formed with a spherical surface 19. The ball 12 is disposed in a socket 20 having a bore 22 and an integrally formed shank 26 projecting from an outside surface of the socket. The bore 22 is formed with a spherical surface 23 to mate with the spherical surface 19 on the main portion 15 of the ball 12. The socket bore 22 diverges radially as it extends in the direction of the stud 14, such as to form a frusto-conical bore end portion 24 corresponding to an outwardly extending frusto-conical integrally formed retention flange 28 over which is stretched an annular bead 30, preferably toroidal, that is substantially circular in section, which is formed integrally at the end edge of a flexible oil-resistant bellows seal 32 having at its other end edge an annular flange 34 which is stretched around the periphery of the stud 14. The bellows seal 32 has a flexible bellows-type pleated tubular body 35 extending between the end annular bead 30 and the end annular flange 34 so that, while its ends remain fast, it can be considerably twisted, stretched and compressed without injury thereto, as shown at FIG. 5.

The retention flange 28 is made by a coining operation on the appropriate end of the forging forming the socket 20.

The socket bore 22 terminates with an annular shoulder 36 and an annular lip 38 forming a circular groove 39 receiving a generally disk-like retainer cap 40. The retainer cap 40 is preferably a stamping of spring steel formed with a centrally disposed threaded neck 41, a partially spherical recess 42 engaging the ball hemispherical protrusion 16, and a peripheral flange 44 extending in the socket groove 39, a reverse bend 45 being formed between the recess 42 and the peripheral flange 44. The neck 41 threadably receives a grease fitting 48.

During assembly of the elements forming the knuckle or swivel joint 10, when the annular lip 38 is formed by swaging the peripheral flange 44 of the retainer cap 40 is captured in the circular groove 39 between the annular shoulder 36 and the annular lip 38. As a result, the peripheral flange 44 of the retainer cap 40, which is generally dished or frusto-conical, is forcibly flattened as shown at 46, causing the spring steel retainer cap 40 to be elastically pre-stressed in the appropriate direction which causes a pre-load to be applied to all the spherical bearing surfaces in swivelling engagement, namely the partially spherical surface 19 on the main body portion 15 of the ball 12 engaged with the partially spherical surface 23 of the socket bore 22, and the surface oof the hemispherical recess 42 of the retainer cap engaged with the surface of the hemispherical protrusion 16 of the ball 12.

The retainer cap 40 acts as an effective closure and seal which, after assembly, prevents introduction of foreign matters into the corresponding end of the socket 20. The space between the annular shoulder 18 of the ball 12 and the inner face of the retainer cap 40 is pre-packed with grease and, in structures provided with a grease fitting 48 as illustrated, the space may be re-packed with grease as the pre-packed grease becomes exhausted. The retainer cap 40 acts as a two-way sealing means which, in addition to preventing entry of foreign matters into the bore 22 of the socket 20 from the corresponding end of the socket, also prevents escape of grease to the outside of the socket.

The bellows seal 32 is installed by disposing the bellows seal over the stud 14, with the edge end of the bellows seal provided with the integral edge annular bead 30 directed toward the frusto-conical flared out retention flange 28 of the corresponding end of the socket bore 22. The annular flange 34 at the end edge of the bellows seal pleated body 35 being elastically stretchable, the inner surface 50 of the seal annular flange 34 firmly engages the peripheral surface of the stud 14. The other end of the bellows seal pleated body 35 provided with the integral annular bead 30 is stretched and passed over the edge of the outwardly tapering retention flange 28. The exterior wall of the retention flange 28, as shown at 52, has an inverse taper, that is its diameter progressively increases from the socket body to the end of the flange, with the result that the bellows seal annular bead 30 and the portion of the bellows pleated body 35 immediately adjacent to the annular bead 30 is, for all practical purposes, literally hooked over the edge of the retention flange 28 and that the edge of the pleated body 35 provided with the annular bead 30 is generally disposed at the bottom of a curvilinear groove 54 formed at the junction between the outwardly flaring retention flange and the main body portion of the socket 20.

Figure 7:
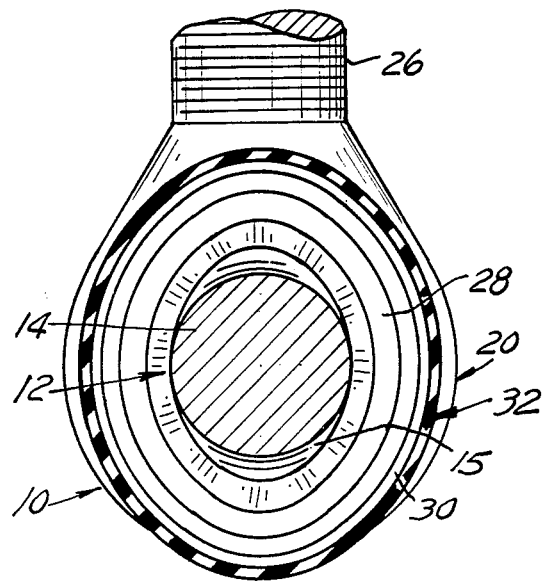
FIG. 7 is a view from line 7—7 of FIG. 6.

The retention flange 28 could, of course, be made with a generally circular edge. However, it is preferable to coin the retention flange 28 with a non-circular perimeter, such as, for example, an elliptical edge. Such a structure is illustrated at FIGS. 6 and 7, FIG. 6 being a section of the example of ball and socket joint 10 provided with the bellows seal 32 of the invention along the minor diameter of the elliptical perimeter of the flange 28, a cross-section along the minor diameter being substantially as illustrated at FIG. 4. The principal advantage of forming the retention flange 28 with a non-circular perimeter is to provide improved anchoring of the end of the seal 32 provided with the toroidal annular bead 30, and of opposing any tendency for the seal 32 to rotate relative to the socket 20.

The bellows seal 32 is made of a convenient elastic stretchable material, preferably of molded neoprene or urethane having a relatively thin wall, and the space between the frusto-conical end portion 24 of the socket bore 22 and the interior surface of the bellows seal 32 may be advantageously pre-packed with grease. During re-filling of the joint assembly with grease through the grease fitting 48, enough pressure is provided by conventional grease guns to force grease between the bearing surfaces by counterbalancing the pre-load pressure provided by the retainer cap 40 such that grease also refills the space within the bellows seal 32. Grease grooves, not shown, may be provided on, for example, the spherical surface 23 of the socket bore 22 for improving lubrication of the swivelling bearing surfaces in engagement and for effecting transfer of grease to the space under the bellows seal 32.

It will be appreciated that the bellows seal and the bellows seal anchoring means of the invention have useful applications to structures other than the specific ball and socket joint structure illustrated and disclosed herein.

It will thus be seen that there has been provided by the present invention an improvement in bellows seals and bellows seals anchoring means for ball and socket joints, for example, in which the object hereinabove set forth, together with many other practical advantages, has been successfully achieved. While a preferred embodiment of the present invention has been shown and described, it is to be understood that variations and changes may be resorted to without departing from the spirit of the present invention as defined in the appended claims.

I claim:

1. In a ball and socket joint comprising a ball and a socket in mutual swivelling sliding engagement, said ball having a stud integrally formed therewith projecting outwardly through one end of said socket, the improvement comprising said socket having at said one end a substantially frusto-conical flange formed such as to radially diverge as said flange extends in the direction of the stud and a resilient tubular body disposed around said stud, wherein said tubular body has an open end stretched around said stud and another open end provided with an integral reinforcing bead elastically passed over the largest outside diameter portion of said frusto-conical flange and said flange has an elongated perimeter.

2. The improvement of claim 1 further comprising an integral annular flange disposed at said first open end of said tubular member.

3. The improvement of claim 1 wherein said reinforcing bead is substantially toroidal.

4. The improvement of claim 1 wherein said tubular member is formed as a bellows.

5. In a structure comprising an elongated member projecting from a housing, an improvement comprising said housing having a substantially frusto-conical flange formed around said elongated member such as to radially diverge as said flange extends in the direction of said elongated member and a resilient tubular member disposed around said elongated member, wherein said tubular member has an open end stretched around said elongated member and another open end provided with an integral reinforcing bead elastically passed over the largest outside diameter portion of said frusto-conical flange and said flange has an elongated perimeter.

6. The improvement of claim 5 further comprising an integral annular flange disposed at said first open end of said tubular member.

7. The improvement of claim 5 wherein said reinforcing bead is substantially toroidal.

8. The improvement of claim 5 wherein said tubular member is formed as a bellows.

9. A method of sealing a junction between an elongated member and a housing from which the elongated member projects, said method comprising providing said housing with a substantially frusto-conical flange formed with an elongated perimeter and disposed around said elongated member such as to radially diverge as said flange extends from said housing, disposing a resilient open-ended tubular member around said elongated member such that an open end of said tubular member is stretched around said elongated member, and elastically stretching the other open end of said tubular member and passing said stretched open end over the largest outside diameter portion of said frusto-conical flange.

10. The method of claim 9 further comprising forming said first-mentioned end of said tubular member with an integral annular flange.

11. The method of claim 9 further comprising forming the other end of said tubular member with an integral reinforcing bead.

12. The method of claim 9 further comprising forming said tubular member as a bellows.

* * * * *